United States Patent Office 3,830,782
Patented Aug. 20, 1974

3,830,782
MODIFIED MELAMINE-FORMALDEHYDE RESINS
Fritz Erdmann Kempter, Stuttgart-Mohringen, and Herbert Spoor, Limburgerhof, Germany, assignors to Badische Anilin- & Soda-Fabrik Aktiengesellschaft, Ludwigshafen (Rhine), Germany
No Drawing. Filed Nov. 29, 1972, Ser. No. 310,643
Claims priority, application Germany, Dec. 2, 1971,
P 21 59 737.5
Int. Cl. C08g 9/24
U.S. Cl. 260—67.6 R       9 Claims

ABSTRACT OF THE DISCLOSURE

Modified melamine-formaldehyde resins which contain o-aminobenzamide units and may be partly or completely etherified with an alcohol. The resins are suitable as baking finishes, particularly when mixed with conventional binders.

---

The present invention relates to modified melamine/formaldehyde resins.

Condensation products of melamine and formaldehyde have been known for a long time. They are used as binders for press-molding compositions and wood-base materials or in surface coatings.

It is an object of the present invention to provide surface coatings which do not show a tendency to undergo embrittlement such as is to be observed particularly in the overbaking of baking finishes, and to enable combinations with conventional coatings resins to be obtained that give stable aqueous dispersions.

This and other objects of the present invention are achieved by a melamine/formaldehyde resin, which may be partly or completely etherified with an alcohol of one to eight carbon atoms, which is characterized in that it contains units of an o-aminobenzamide which may bear alkyl or halogen as a substituent.

Mixtures of these modified melamine resins with conventional surface coating binders are also included in the scope of the present invention.

Substantial elasticization is achieved by the modification of the melamine resins with o-aminobenzamide (anthranilamide). Another advantage of the melamine resins modified according to the invention is that in combination with other conventional coatings resins they give stable aqueous dispersions and ensure good compatibility with basic binders.

The production of the modified melamine resins of the invention is carried out by conventional methods for the production of melamine resins, for example as disclosed in Houben-Weyl, "Methoden der organischen Chemie" (Thieme-Verlag, Stuttgart, 1963) volume 14/2, pages 358 to 363 and 365 to 369.

Melamine resins modified in accordance with this invention generally contain from 30 to 50% by weight of melamine, from 40 to 70% by weight of formaldehyde and from 0.5 to 20%, preferably from 2.5 to 15%, by weight of units of o-aminobenzamide or its nuclear-substituted monoalkyl, dialkyl, monohalogen or dihalogen derivatives, the alkyl radicals attached to the phenyl radical containing from one to four carbon atoms and the halogen being chlorine or bromine.

The modified melamine resins of the invention may not only contain unetherified methylol groups but may also be partly or completely etherified with alcohols containing one to eight carbon atoms. Particularly suitable alcohols of one to eight carbon atoms are linear and branched alcohols as for example methanol, ethanol, n-propanol, isopropanol, n-butanol, isobutanol, hexanol, octanol and 2-ethylhexanol. Oxaalkanols and/or unsaturated alcohols as for example allyl alcohol or methallyl alcohol may however also be used as etherification components.

The degree of etherification and the use of specific alcohols depends on the intended application (reactivity etc.). The resins are usually etherified with n-butanol or isobutanol.

Hardening of the melamine resins according to the invention is also carried out by known methods (see the abovementioned article in Houben-Weyl).

Resins according to the invention may be used as binders for molding materials and wood-base materials and for the production of coatings, bonds and impregnations for example for woven and nonwoven fibrous materials. The partly or completely alcohol-etherified modified melamine resins of the invention are used particularly in the coatings field.

The following are conventional surface coating binders which may be advantageously used mixed with the melamine resins modified in accordance with the invention: oil-containing and oil-free alkyd resins, heat-hardenable acrylate resins and epoxide resins. These are generally combined with the modified melamine resin in amounts of from 60 to 90% by weight, preferably from 70 to 85% by weight (based on the total binder). Combinations with alkyd resins, acrylate resins and epoxide esters are particularly advantageous.

Depending on the binder employed, the coatings are suitable as baking finishes on a great variety of substrates, as for example wood, glass, ceramics and metal and if desired may be used together with conventional pigments, as for example titanium dioxide, lithopone, fillers and conventional accessory materials, as for example barium sulfate and silicates.

The resins or resin mixtures of the invention are conveniently heated at temperatures of from 120° to 200° C. for from three to thirty minutes, preferably at from 130° to 160° C. for from about nine to twenty minutes, to harden them. Hardening will also take place at lower temperatures when a suitable catalyst, as for example p-toluenesulfonic acid, is added.

Coatings may be prepared with the resins or resin mixtures according to the invention which have been mixed with diluents conventionally used in the surface coatings industry, as for example alcohols, esters and cycloaliphatics as well as aromatics, to achieve the desired viscosity, by the methods conventionally used in the surface coatings industry, such as spraying, dipping or flooding. They are also suitable for electrocoat and coil-coat finishes.

Melamine resins modified with anthranilamide in accordance with the invention unlike prior art melamine resins have an elasticizing effect without the other properties of the coating being adversely affected. Moreover resins modified in accordance with the invention are distinguished by increased reactivity when mixed with conventional oil-modified alkyd resins and used as baking finishes.

The following Examples illustrate the invention. Parts and percentages specified in the Examples are parts and percentages by weight.

EXAMPLE 1

151.2 parts of melamine, 20 parts of anthranilamide, and 600 parts of aqueous formaldehyde (40%) are heated with 1 part of magnesium carbonate to 70° C. while stirring and kept at 75° to 80° C. for ten minutes. 600 parts of isobutanol and 70 parts of benzene are then added and a total of 480 parts of water is removed with an addition of 1 part of phthalic anhydride over a period of 6.5 hours at a temperature of from 82° to 99° C. The resin solution is filtered under pressure at 90° C. 886 parts of modified melamine resin solution is obtained having a solids content of 51%.

Comparison with a commercial melamine/formaldehyde resin etherified with isobutanol:

The commercial alkyd resin used is a phthalate resin (e.g. alkydal C 40) modified with coconut fatty acid in xylene, 60% solids. Pigmentation is carried out in the conventional manner with 30% of titanium dioxide Kronos RN 59.

(a)

75 parts of the abovementioned alkyd resin + 25 parts of commercial melamine resin (etherified with isobutanol)

(b)

75 parts of the abovementioned alkyd resin + 25 parts of resin according to the invention.

The pigmented resin mixtures are applied to deep drawn sheet in a layer having a thickness of from 40 to 45 microns.

In the following Table, PH=pendulum hardness according to König in seconds (average of three measurements); EI=Erichsen indentation in mm. (average of three measurements).

| | Baking and overbaking conditions | PH | EI |
|---|---|---|---|
| (a) | 20 minutes at 160° C | 104 | 4.5 |
| | 40 minutes at 160° C | 108 | 3.6 |
| | 24 hours at 150° C | 119 | 3.5 |
| (b) | 20 minutes at 160° C | 98 | 5.9 |
| | 40 minutes at 160° C | 104 | 5.6 |
| | 24 hours at 150° C | 109 | 5.6 |

Short-term weathering of lacquer samples (a) and (b) in a Weather-Ometer (1000 hours) according to the twenty-four hour cycle given below did not affect the melamine resin of the invention as regards gloss and tendency to yellowing.

Twenty-four hour cycle (lamp intensity about 100,000 lux):

6 hours at 45° C. 100% relative humidity
2 hours at 8° C. wet, dark
3 hours at 20° C. spray, bright, 100% humidity
3 hours at 25° C. dry, bright, 65% humidity
2 hours at 8° C. wet, dark
3 hours at 25° C. dry, bright, 65% humidity
3 hours at 20° C. spray, bright, 100% humidity
2 hours at 8° C. wet dark.

EXAMPLES 2 to 4

| Example number | Parts of— | |
|---|---|---|
| | Melamine | Anthranilamide |
| 2 | 161.2 | 10 |
| 3 | 131.2 | 40 |
| 4 | 111.2 | 60 |

The mixtures of melamine and anthranilamide given in the above Table are condensed as described in Example 1 in each case with 600 parts of aqueous formaldehyde (40%) and etherified with isobutanol.

The melamine resin solutions obtained are mixed as described in Example 1 with commercial alkyd resin in xylene and pigmented with titanium dioxide, applied to deep drawn sheet in a layer of the thickness from 40 to 45 microns, baked and tested for hardness and elasticity of the coating.

| Example No. | Baking and overbaking conditions | PH | EI |
|---|---|---|---|
| 2 | 20 minutes at 160° C | 100 | 5.8 |
| | 40 minutes at 160° C | 107 | 5.4 |
| | 24 hours at 150° C | 106 | 5.0 |
| 3 | 20 minutes at 160° C | 98 | 6.5 |
| | 40 minutes at 160° C | 98 | 6.4 |
| | 24 hours at 150° C | 109 | 6.0 |
| 4 | 20 minutes at 160° C | 83 | 7.4 |
| | 40 minutes at 160° C | 95 | 6.9 |
| | 24 hours at 150° C | 101 | 7.1 |

We claim:
1. A modified melamine/formaldehyde resin whose free methylol groups have been etherified to the extent of from 0 to 100% with an alcohol of one to eight carbon atoms and which contains condensed therein at least one compound selected from the group consisting of unsubstituted o-aminobenzamide and said o-aminobenzamide nuclear-substituted by monoalkyl, dialkyl, monohalogen or dihalogen, said alkyl being of one to four carbon atoms and said halogen being chlorine or bromine.

2. A modified melamine/formaldehyde resin as claimed in claim 1 which contains from 0.5 to 20% by weight of o-aminobenzamide units.

3. A modified melamine/formaldehyde resin as claimed in claim 1 which contains from 2.5 to 15% by weight of o-aminobenzamide units.

4. A modified melamine/formaldehyde resin as claimed in claim 1 which is at least partly etherified with n-butanol.

5. A modified melamine/formaldehyde resin as claimed in claim 1 which is at least partly etherified with isobutanol.

6. A modified melamine/formaldehyde resin as claimed in Claim 1 which contains from 30 to 50% by weight of melamine, from 40 to 70% by weight of formaldehyde and from 0.5 to 20% by weight of o-aminobenzamide units.

7. A modified melamine/formaldehyde resin as claimed in Claim 6 which is at least partly etherified with n-butanol or isobutanol.

8. A modified melamine/formaldehyde resin as claimed in Claim 7 which contains from 2.5 to 15% by weight of o-aminobenzamide units.

9. A modified melamine/formaldehyde resin as claimed in Claim 7 wherein the o-aminobenzamide units are provided by unsubstituted o-aminobenzamide.

References Cited

UNITED STATES PATENTS

| 2,859,188 | 11/1958 | Heider et al. | 260—21 |
| 3,535,318 | 10/1970 | Oppelt et al. | 117—139.4 |
| 3,538,026 | 11/1970 | Standish et al. | 260—39 R |
| 3,557,031 | 1/1971 | Standish et al. | 260—17.3 |

FOREIGN PATENTS

| 898,290 | 6/1962 | Great Britain | 260—67.6 R |

OTHER REFERENCES

Chemical Abstracts, volume 65, No. 10, Nov. 7, 1966, p. P15607f.

Chemical Abstracts, volume 71, No. 19, Nov. 10, 1969, p. P90822n.

Chemical Abstracts, volume 75, No. 5, Aug. 2, 1971, p. 35353t.

DONALD E. CZAJA, Primary Examiner

R. W. GRIFFIN, Assistant Examiner

U.S. Cl. X.R.

117—161 K, 161 L N; 260—21, 22 C Q, 29.4 R